United States Patent [19]
Raidel

[11] Patent Number: 4,494,771
[45] Date of Patent: Jan. 22, 1985

[54] SUSPENSION SYSTEM WITH U-JOINT MOUNTED LOAD CARRYING TORQUE ARM

[76] Inventor: John E. Raidel, Rte. 9, Box 400M, Springfield, Mo. 65804

[21] Appl. No.: 523,964

[22] Filed: Aug. 17, 1983

Related U.S. Application Data

[63] Continuation-in-part of Ser. No. 341,565, Jan. 21, 1982, Pat. No. 4,445,707, and a continuation-in-part of Ser. No. 431,755, Sep. 30, 1982, Pat. No. 4,465,298, which is a continuation-in-part of Ser. No. 341,474, Jan. 21, 1982, abandoned.

[51] Int. Cl.³ ............................................. B60G 5/00
[52] U.S. Cl. .................................. 280/711; 280/683; 280/687
[58] Field of Search ............... 280/676, 683, 684, 685, 280/686, 687, 702, 711

[56] References Cited

U.S. PATENT DOCUMENTS

4,181,323 1/1980 Raidel ................................. 280/711
4,278,271 7/1981 Raidel ................................. 280/711

*Primary Examiner*—Richard A. Bertsch
*Attorney, Agent, or Firm*—Rogers, Eilers, Howell, Renner, Moore and Haferkamp

[57] ABSTRACT

A first embodiment of a suspension supports a vehicle from a drive axle and includes a forward hanger and a rearward hanger depending downwardly from the chassis, an axle seat assembly attaching the suspension to the axle, a first torque arm pivotally connected between the axle seat asssembly and the forward hanger, a second torque arm pivotally connected between the axle seat assembly and the rear hanger, a central elastomer spring mounted between opposing surfaces of the torque arms, and an upper radius rod pivotally connected and extending between the forward hanger and axle seat assembly to form a parallelogram with the first torque arm to control and stabilize the axle. A second embodiment of the same suspension mounts a vehicle chassis to a steer axle with the radius rod being offset inwardly and the axle seat being mounted to the top of the steer axle to accommodate space limitations. In a variation of the second embodiment, a U-joint comprising a pair of transversely oriented bushings mount either end of each torque arm to minimize torsional forces in each torque arm as one end of the axle oscillates differently than the other with respect to the chassis, and a beam guide limits lateral shifting of the suspension.

11 Claims, 20 Drawing Figures

SUSPENSION SYSTEM WITH U-JOINT MOUNTED LOAD CARRYING TORQUE ARM

BACKGROUND AND SUMMARY

This application is a continuation-in-part of Ser. No. 06/341,565 filed Jan. 21, 1982 now U.S. Pat. No. 4,445,707; and a continuation-in-part of Ser. No. 06/431,755 filed Sept. 30, 1982 now U.S. Pat. No. 4,465,298, which is a continuation-in-part of Ser. No. 06/341,474 filed Jan. 21, 1982 now abandoned.

In a suspension system for a truck or other heavy duty vehicle, it is important to control the pitch of the axle as the axle oscillates with respect to the chassis. For the drive axle, it is important to maintain alignment of the drive train as the axle oscillates and to maintain the wheels in contact with the ground under all conditions. Similarly, with a steer axle, it is important to maintain the axle in alignment to ensure proper steering response and to also control the axle during oscillation, braking, and acceleration so that the operator has full control of the vehicle under all conditions.

Applicant has previously invented and patented suspensions which utilize a parallelogram structure for controlling and stabilizing the axle. Some of these include U.S. Pat. No. 4,114,926; U.S. Pat. No. 4,132,432; and U.S. Pat. No. 4,181,323; the disclosures of which are incorporated herein by reference. These patents disclose air spring suspensions utilizing parallelogram structures of various types to stabilize the axle under all conditions of oscillation, braking, and acceleration. This arrangement offers many advantages over suspensions of the prior art, such as eliminating wheel hop and axle windup during emergency braking, as explained more completely therein. While these inventions are limited only by the scope of the claims, the preferred embodiments disclose suspensions for both drive axles and steer axles stabilized by a parallelogram.

Applicant has also designed and developed a suspension system for a tandem axle which incorporates a central elastomer spring disposed between two pivotally mounted torque arms such that loading of the vehicle pivots the torque arms and compresses the central elastomer spring. This invention is disclosed and claimed in U.S. Pat. No. 4,278,271, the disclosure of which is incorporated herein by reference. As explained more fully therein, the central elastomer spring provides a smooth ride and, at the same time, has sufficient resiliency to support substantial loads. Additionally, a major advantage of the central elastomer spring is that it may be easily removed and replaced, and is a less complicated structure requiring fewer parts and therefore is less expensive to manufacture and maintain. Another feature of the central elastomer spring suspension is that the load capacity of the suspension may be changed by simply removing the elastomer and replacing it with another having greater or lesser resiliency, as desired. Although the invention as disclosed in applicant's prior U.S. Pat. No. 4,278,271 is limited only by the scope of the claims, the preferred embodiment shown therein is a suspension adapted for use with a tandem axle vehicle such as a trailer with a non-powered, non-steerable axle/chassis arrangement.

In the suspension of the present invention, applicant has succeeded in combining the many advantages of parallelogram stabilization with the advantages of a suspension having a central elastomer spring for use with a drive axle and a steer axle. The first embodiment, which is adapted for use with a drive axle, has a first hanger assembly mounted at the forward end of the suspension, a second hanger assembly mounted at the rearward end of the suspension, a generally U-shaped axle seat mounted over the axle in an inverted orientation, and first and second torque arms pivotally mounted to and extending between the axle seat assembly and one of the hangers. A radius rod pivotally mounted to and extending between the forward hanger and the axle seat assembly along with the forward torque arm completes the parallelogram. The central elastomer spring is disposed beneath the axle and held in place between the torque arms by dowel pins extending into an axle hole in the spring, so that loading of the vehicle pivots the torque arms and compresses the spring. Tension rails bolt to and extend between the legs of the U-shaped axle bracket to prevent them from opening up under load. A shackle assembly pivotally mounts the rear torque arm to the rear hanger assembly to permit free vertical movement of the axle as controlled by the parallelogram. The bolts fastening the tension rods to the axle seat assembly extend inwardly sufficiently to contact each torque arm as it pivots away from the central spring to limit its movement and prevent inadvertent release of the central spring. Removal of these bolts and separation of the axle from the chassis releases the spring such that it can be lifted out by hand. One or more shock absorbers extend between the chassis and axle seat assembly to dampen axle movement.

A second embodiment is adapted for use with a steer axle and includes many of the same component parts as is used in the first embodiment for the drive axle. This adds to the versatility of applicant's invention by minimizing inventory required to manufacture and maintain both suspensions. In the second embodiment, a different axle seat assembly bolts to the top of the steering axle, with the same torque arms pivotally secured to and extending between front and rear hanger assemblies, as in the first embodimemt. However, the central elastomer spring is disposed immediately above the steering axle, and set screws extend upwardly through the bottom of the axle seat assembly to limit torque arm movement and prevent release of the spring. The same radius rod is positioned inwardly of the forward torque arm to avoid interference with controls for the steering arm and also meet the reduced space limitations inherent in a steering axle suspension. Other components used are exactly the same as in the first embodiment.

In a variation of the second embodiment, the inventor herein has adapted his unique U-joint mount for torque beams as disclosed and claimed in his prior U.S. patent application Ser. No. 06/431,755 filed Sept. 30, 1982 to the present suspension disclosed herein. In a first version, a coaxial bushing having either bronze or self-lubricating fiber bearing surfaces is aligned with each torque arm, with a second, transversely oriented bushing pivotally secured thereto and pivotally mounted to the axle seat comprising the other part of the U-joint. Thus, the inner end of each torque arm adjacent the axle seat is free to twist in response to uneven loading at the opposite ends of the axle to eliminate torsional forces in the beam. In a second version, the U-joint mounts the opposite end of each torque arm suspended from the chassis which permits virtually the entire suspension to follow the axle. In this second version, a coaxial bushing is longitudinally oriented along the plane of each torque arm and pivotally connected to the lower, transversely oriented bushing of the shackle assembly. In both versions, one of the bushings has an elastomeric member to permit limited lateral oscillation between the suspension and chassis.

The U-joint mount for each torque arm controls axle movement and stabilizes the suspension as the ends of the axle move up or down with respect to each other in response to uneven road surfaces, or as one side of the truck goes over a curb, chuck hole, or other significant change in elevation with respect to the other side of the vehicle. Furthermore, the U-joint virtually eliminates the torsional forces in the torque arms which would otherwise be experienced as the axle moves differently at opposite sides of the vehicle. The elastomeric member in the bushing permits the torque arms to oscillate to a limited extent with respect to the chassis to allow still greater freedom of movement.

Still another feature which is shown with the U-joint variation of the second embodiment is a beam guide comprising an upstanding bracket member welded to the axle seat and a replaceable wear pad bolted to the chassis rail frame against which the bracket member is free to slide should the suspension shift during vehicle operation. As can be appreciated, a suspension with beam guide is mounted to each side of the vehicle so that the chassis frame is "captured" between the beam guides which limits the lateral shifting of the suspension to the left or right.

In both embodiments, the central spring may be easily removed by loosening the bolts or set screws, as appropriate, elevating the vehicle to separate the axle from the chassis which also pivots apart the torque arms, and lifting the spring from between the torque arms and dowel pins. The spring may then be replaced and the suspension placed back in working condition by reversing the above procedure.

The above are just some of the features and advantages of applicant's suspension. A more complete understanding of these and other advantages may be obtained by referring to the description of the preferred embodiment and drawings.

DETAILED DESCRIPTION OF THE PREFERRED EMBODIMENTS

Figures 1, 2:
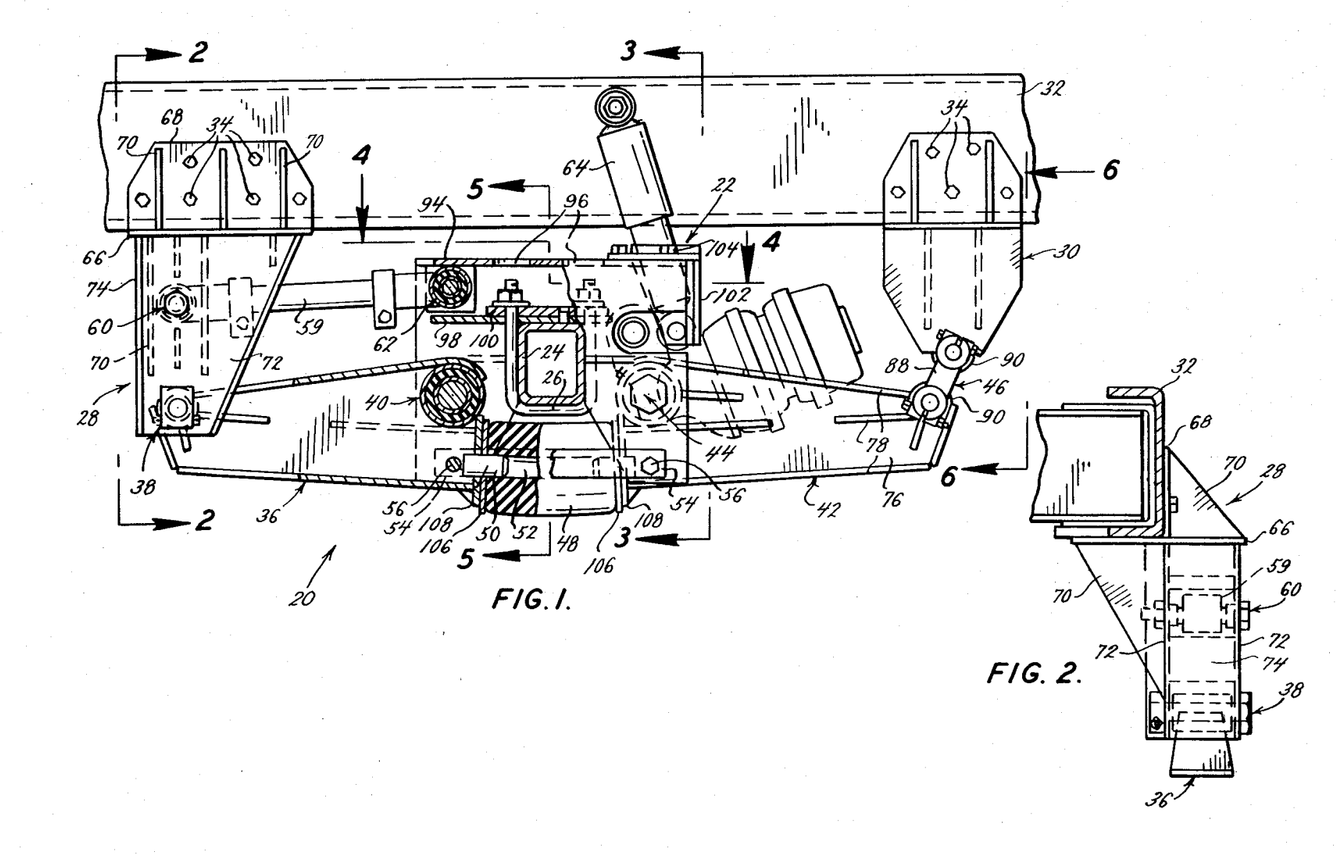
FIG. 1 is a side view of the first embodiment showing the suspension adapted for use with a drive axle.
FIG. 2 is a front view of the suspension of FIG. 1 taken along the plane of line 2—2 in FIG. 1.
Figure 3:
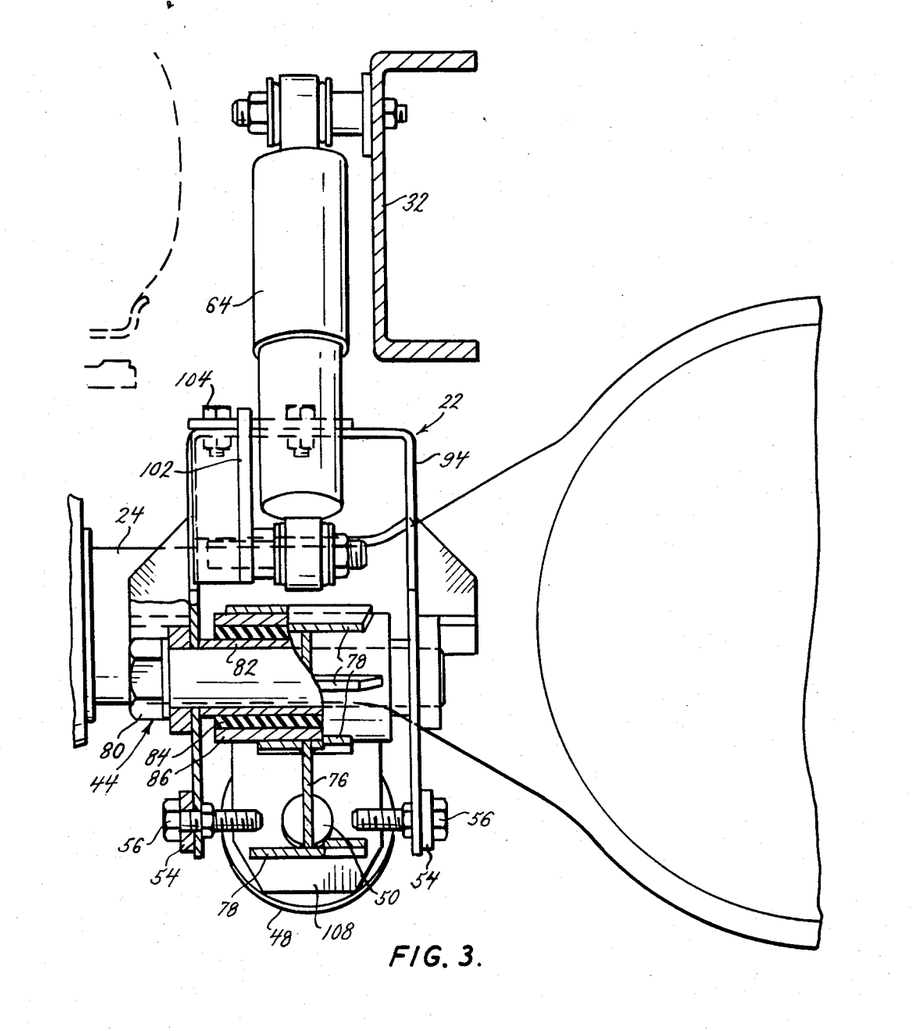
FIG. 3 is a cross-sectional view of the first embodiment taken along the plane of line 3—3 in FIG. 1 and detailing the axle seat and torque arm pivot point.

Applicant's first embodiment 20 is shown in FIGS. 1-6 and will first be described generally as an aid in understanding the invention. Referring to FIG. 1, the suspension 20 generally includes a U-shaped axle seat assembly 22 which is inverted and mounted over a drive axle 24 with U-bolt 26. A forward hanger assembly 28 and rearward hanger assembly 30 are bolted to the chassis 32 by bolts 34 and depend downwardly therefrom, as shown. A first torque arm 36 is pivotally connected to the forward hanger assembly 28 by bushing 38 and to the axle seat assembly 22 by bushing assembly 40. Similarly, a second torque arm 42 is pivotally mounted to axle seat assembly 22 by bushing 44 at its forward end and pivotally mounted to the rear hanger 30 by shackle assembly 46. A central elastomer spring 48 is disposed between torque arms 36, 42 and is held in place by dowel pins 50 mounted to torque arms 36, 42 and aligned with a generally cylindrical axle hole 52 through spring 48. A pair of tension rails 54 are bolted to the opposing legs of the U-shaped axle seat assembly 22 by bolts 56 to prevent separation of the axle seat assembly 22 under load. As best shown in FIG. 3, bolts 56 extend inwardly sufficiently far to contact the torque arms 36, 42 as they pivot away from central spring 48 to prevent its release as the axle 24 oscillates with respect to the chassis 32. An upper radius rod 59 is pivotally connected to forward hanger 28 by bushing 60 and to axle seat assembly 22 by bushing assembly 62. One or more shock absorbers 64 may be mounted at any convenient place in the suspension such as between the axle seat assembly 22 and chassis 32, as shown.

The forward hanger assembly 28 is shown in greater detail in FIG. 2 and includes a base plate 66 and a mounting plate 68 with reinforcing webs 70 extending therebetween. The lower portion of the hanger 28 includes two side plates 72 between which are mounted bushing assemblies 38, 60 for the first torque arm 36 and upper radius rod 58, respectively. An end plate 74 extends between side plates 72 and encloses the space therebetween. Other reinforcing webs 70 are also included, as desired, to further strengthen the hanger assembly 28.

The second torque arm 42 is typical of both torque arms and is shown in greater detail in FIG. 3. Torque arm 42 includes a central web 76 with cross members 78 along the edges and at several places therebetween to strengthen same. Thus, the torque arm 42 takes the general shape of an I-beam with intermediate cross members 78 further strengthening same at the pivot points.

The bushing assembly 44 is also shown in cross-sectional detail in FIG. 3 and includes a central bolt 80 with an inner sleeve 82, a rubber or elastomeric member 84 and an outer sleeve 86. Bushing assembly 44 mounts second torque arm 42 by being welded to the outer sleeve 86, as shown. The first or forward torque arm 36 is similarly mounted by bushing assembly 40, bushing assembly 40 being constructed identically to bushing assembly 44.

Figure 6:
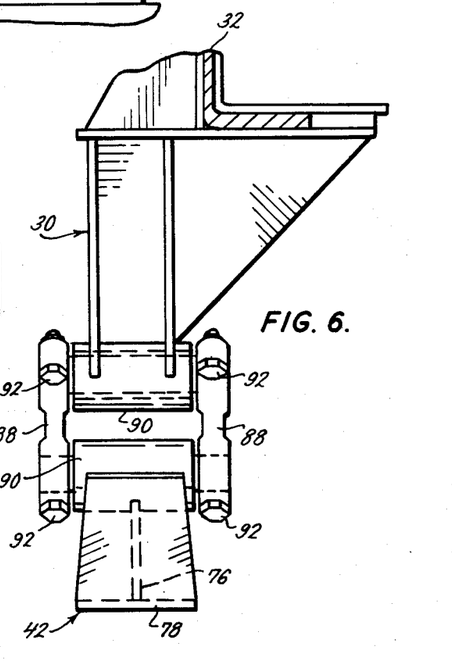
FIG. 6 is a rear view of the first embodiment taken along the plane of line 6—6 in FIG. 1 and further detailing the shackle assembly at the rear of the suspension.

Shackle assembly 46 is best shown in FIG. 6 and is simply constructed of a pair of pivot arms 88 rotatably attached to bushing assemblies 90 at the end of second torque arm 42 and at the bottom of rearward hanger assembly 30. Either self lubricating fiber bushing assemblies may be used, or bronze bushings with lubrication fittings 92 as shown.

Figure 4:
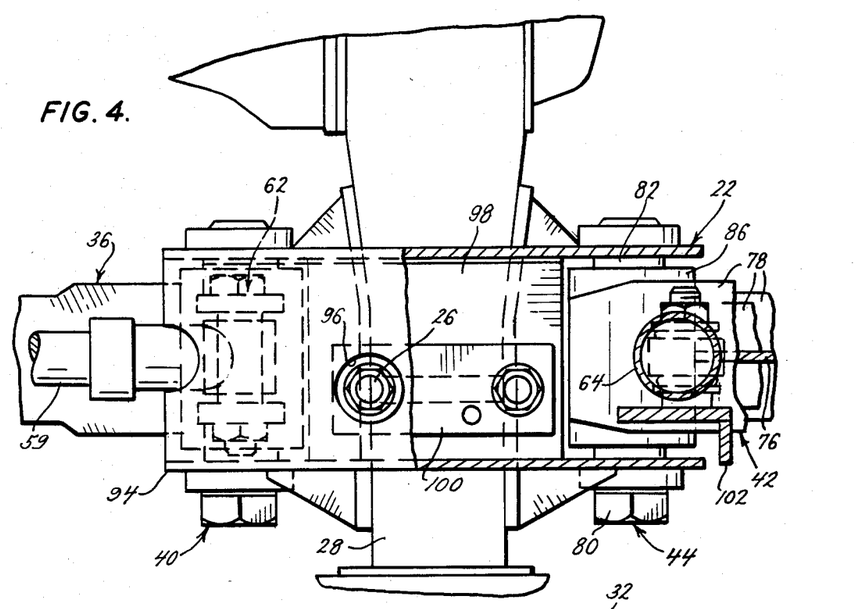
FIG. 4 is a top view of the axle seat of the first embodiment taken along the plane of line 4—4 in FIG. 1 and in partial cross-section to detail torque arm and axle mounting.
Figure 5:
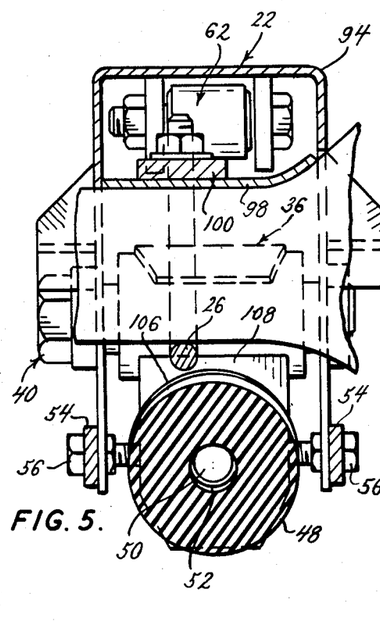
FIG. 5 is a cross-sectional view of the axle seat and axle taken along the plane of line 5—5 in FIG. 1.

The U-shaped axle seat assembly 22 is best shown in FIGS. 3, 4, and 5 and generally includes a U-shaped bracket 94 which is also U-shaped in cross-section. As shown in FIG. 4, a pair of openings 96 are formed in the top of bracket 94 for access to the U-bolt 26 which secures axle seat assembly 22 to drive axle 24. A cross bracket member 98 is welded to and extends between the sides of U-shaped bracket 94. U-bolt 26 surrounds axle 24 and mounts to bracket member 98 to secure axle seat assembly 22 thereto. A second bracket 100 mounts between the legs of U-bolt 26 and atop cross bracket 98 to further strengthen and secure the mounting of the axle seat assembly 22.

A central elastomer spring 48 is formed into a generally cylindrical shape and extends between spring surface pads 106 mounted to spring platforms 108 formed in each of the torque arms 36, 42, as is best shown in FIG. 1. As explained above, dowel pins 50 are mounted to and extend out of pads 106 and platforms 108 to be received by the cylindrical hole 52 which extends along the center axis of spring member 48. Thus, the central elastomer spring 48 is captured between torque arms 36, 42 by dowel pins 50. Also as explained above, the shanks of bolts 56 which mount tension rails 54 extend sufficiently inward to contact the spring platforms 108 and limit the pivoting movement of torque arms 36, 42 to prevent unintended release of the spring.

Other suspension components are shown in the drawings, and it is believed that a detailed description thereof is not required as they have been previously explained in applicant's prior patents as mentioned above, and are also well known in the art.

One or more shock absorbers 84 may be mounted at any convenient position along the suspension 20. As an example thereof, applicant has depicted a typical mounting position built into the axle seat assembly 22, as best shown in FIG. 3. A mounting bracket 102 is bolted to the top of axle seat 22 by bolt 104 which provides a convenient mounting position for the lower end of shock absorber 64. The upper end thereof is conveniently mounted to chassis member 32, as shown.

Figures 7, 8:
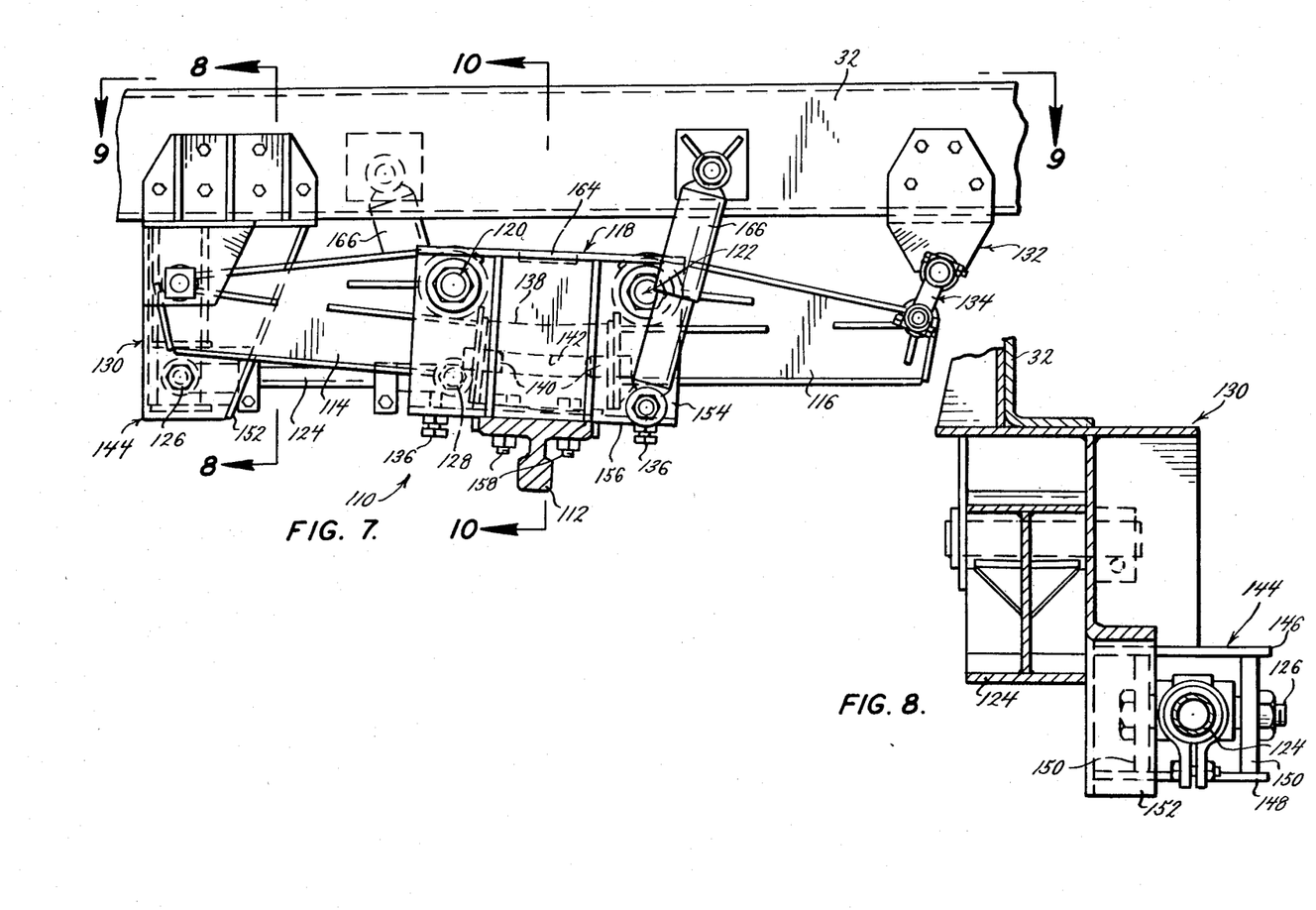
FIG. 7 is a side view of the second embodiment of applicant's suspension as used for a steer axle.
FIG. 8 is a cross-sectional view of the forward hanger and inwardly offset radius rod taken along the plane of line 8—8 in FIG. 7.
Figures 9, 10:
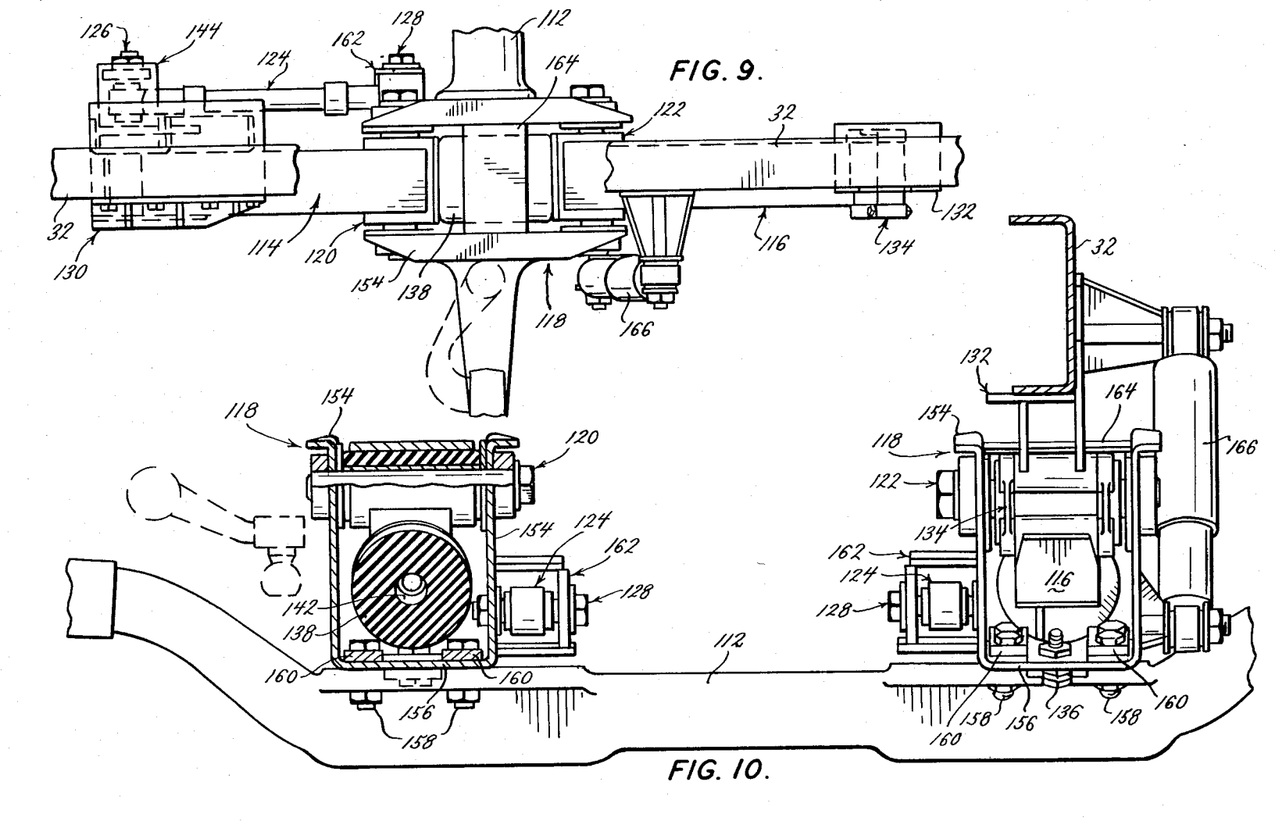
FIG. 9 is a top view of the second embodiment taken along the plane of line 9—9 in FIG. 7.
FIG. 10 is a cross-sectional view of the axle seat and axle and a rear view of the suspension mounted at the opposite side of the vehicle taken along the plane of line 10—10 in FIG. 7.

Applicant's second embodiment 110 of the suspension as adapted for use with a steer axle 112 is shown in FIGS. 7–10 and includes many of the same components as in applicant's first embodiment 20. For example, torque arms 114, 116 are exactly the same as torque arms 36, 42 of the first embodiment. Although the axle seat assembly 118 is slightly different, torque arms 114, 116 are secured to axle seat assembly 118 by bushings 120, 122 which are exactly the same as bushings 40, 44 of the first embodiment. The radius rod 124 is exactly the same component and is secured by bushings 126, 128 which are the same as bushings 60, 62. However, in applicant's second embodiment 110 the radius rod 124 is positioned below the first torque arm 114 and is offset inwardly therefrom as is best shown in FIGS. 8 and 9. For this purpose, the forward hanger 130 is slightly different and will be explained. The rear of second torque arm 116 is secured to the rear hanger 132 by shackle assembly 134 which directly corresponds to the first embodiment. Because of the different shape and orientation of the axle seat assembly 118, there are no tension rails 54 and bolts 56 to limit the pivoting movement of torque arms 114, 116. Accordingly, set screws 136 are mounted through the bottom of axle seat assembly 118 and extend upwardly therein to perform the same function. The central elastomer spring 138, including dowel pins 140 and cylindrical hole 142 are exactly as shown in applicant's first embodiment 20. However, it is noted that the arrangement of the torque arms 114, 116 with bushings 120, 122 at the top of axle seat assembly 118 permit positioning of the central elastomer spring 138 above steer axle 112 while in applicant's first embodiment 20 the central elastomer spring 48 is positioned below drive axle 24. These differences will now be explained in more detail.

As best shown in FIG. 8, the forward hanger assembly 130 has an offset inward bracket extension 144 comprising an upper bracket member 146, lower bracket member 148 and vertical mounting brackets 150 extending therebetween. A side bracket 152 partially encloses the bracket extension 144, as shown. This provides an inboard mounting position for radius rod 124 such that the pivoting movement of torque arm 114 is not restricted thereby.

Axle seat assembly 118 is best shown in FIGS. 7 and 10 and generally includes a U-shaped bracket 154 with its base 156 mounted to steer axle 112 by bolts 158 and cross brackets 160. An offset bracket extension 162, similar to offset bracket extension 144 is welded to the inboard side of U-shaped bracket 154 and provides the pivotal mount for the rear end of radius rod 124. As best shown in FIG. 9, a cross bracket member 164 joins the upper legs of the U-shaped bracket 154 to strengthen same. As shown in the right hand side of FIG. 10, set screw 136 is mounted to the base 156 of U-shaped bracket 154 and extends upwardly between cross brackets 160 to contact torque arm 116 as it pivots away from the central elastomer spring 138 and prevent its release. As shown in FIGS. 7, 9, and 10, one or more shock absorbers 166 may be conveniently mounted to axle seat assembly 118 and extend therefrom to chassis member 168.

The suspension as shown in FIGS. 11 to 14 is very similar to that depicted in FIGS. 7 to 10 and includes many of the same components except that U-joints 180, 182 mount torque arms 184, 186 from axle seat 188; and beam guide 190 maintains the lateral alignment of the suspension 192 as it oscillates with respect to the chassis 194. As can be seen from comparing FIG. 11 with FIG. 7, the suspension 192 of FIG. 11 very closely resembles the suspension 110 of FIG. 7. For example, torque arms 184, 186 are very similar to torque arms 114, 116; shackle assembly 195 is very similar to shackle 134; front hanger assembly 196 and rear hanger assembly 198 are very similar to hangers 130, 132; and radius rod 200 is very similar to radius rod 124, except that radius rod 200 is pivotally connected by bushings 202, 204 between axle seat 188 and front hanger 196, bushing 204 being mounted to bracket 206 directly beneath axle seat assembly 188 instead of being offset as shown in FIGS. 7 and 8. Of course, steer axle 208 is the same as steer axle 112, shock absorber 210 is the same as shock absorber 166, elastomer spring 212 is the same as elastomer spring 138, and set screw 214 is the same as set screw 136. The principal differences between suspension 192 and suspension 110 are in the U-joints 180, 182 suspending torque arms 184, 186 from axle seat 188, and beam guide 190, the detailed structure of which shall now be explained.

Figures 11, 12, 13, 14:
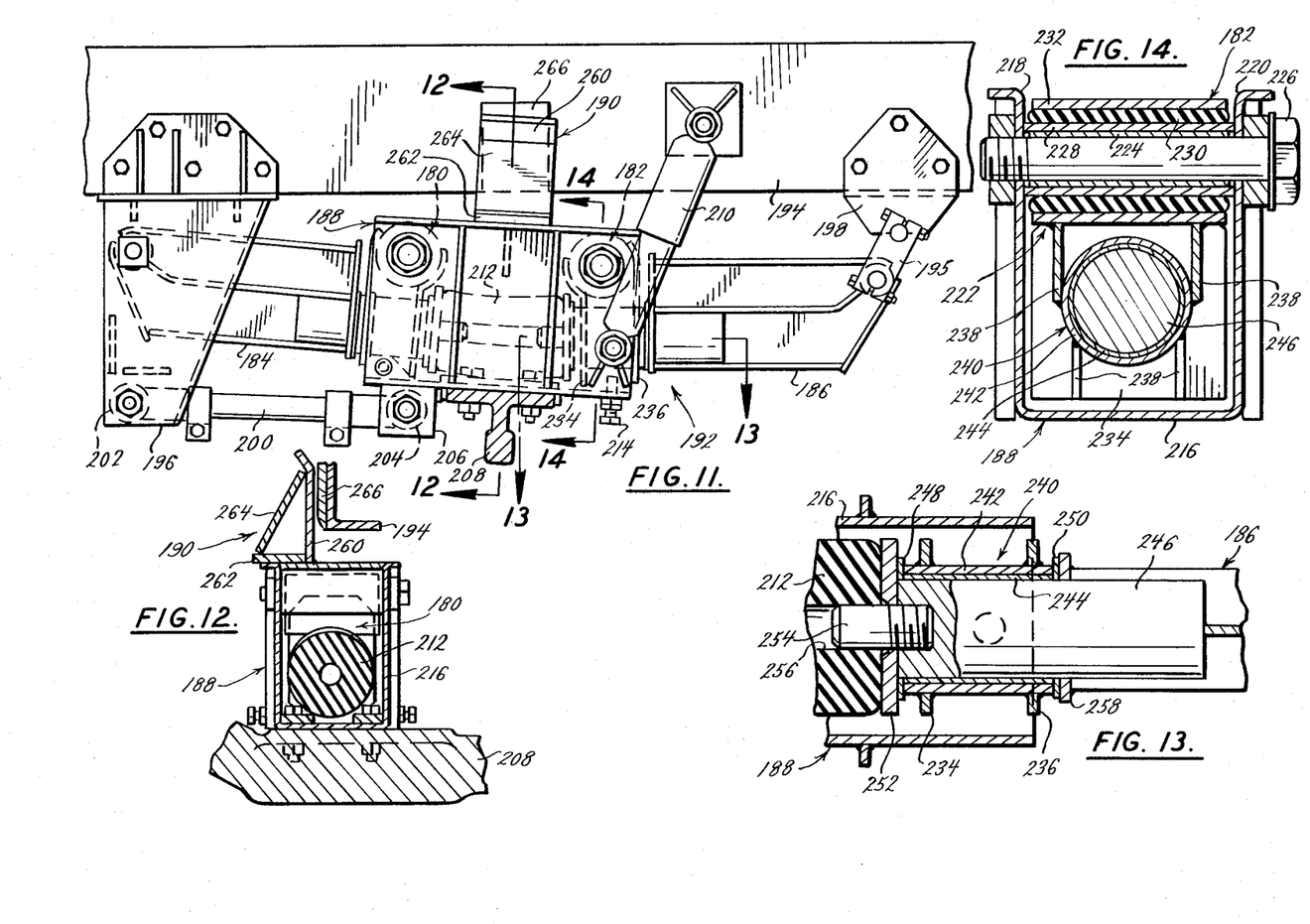
FIG. 11 is a side view of the second embodiment for use with a steer axle, with U-joint mounts between the torque arms and axle seat, and a beam guide.
FIG. 12 is a cross-sectional view of the axle seat, central elastomer spring, and beam guide taken along the plane of line 12—12 in FIG. 11.
FIG. 13 is a partial cross-sectional view of the co-axle bushing of the U-joint taken along the plane of line 13—13 in FIG. 11.
FIG. 14 is a cross-sectional view of the transverse bushing of the U-joint taken along the plane of line 14—14 in FIG. 11.

As shown in FIG. 14, axle seat assembly 188 includes a U-shaped bracket member 216 with upstanding bracket members 218, 220. A transversely mounted bushing 222 extends between bracket members 216, 218 and forms the upper portion of U-joint 182. Bushing assembly 222 includes an inner self-lubricating fiber sleeve 224 surrounding the shank of bolt 226, a second sleeve 228 surrounding sleeve 224 which provides the bearing surface for bushing 222, and elastomeric member 230, and an outer collar 232. Hanger plates 234, 236 (as shown in FIG. 11) and strengthening brackets 238 join upper bushing 222 to lower bushing 240 which includes an outer collar 242 and an inner sleeve 244 surrounding torque arm 246. This is shown in greater detail in FIG. 13 which depicts the torque arm 246 and inner sleeve 244 surrounded by spacer washers 248, 250 with collar member 242 surrounding inner sleeve 244 and welded to plates 234, 236. Spring plate 252, dowel pin 254 and cylindrical hole 256 are as shown in the suspension 110 of FIG. 7. A flange 258, and spring plate 252 surround washers 248, 250 and maintain collar member 242 about inner sleeve 244 during operation. The lower bushing 240 maybe made of self-lubricating fiber material or bronze with lubrication fittings, as known in the art.

The beam guide 190 is shown in greater detail in FIG. 12 and includes an upstanding bracket member 260 with bottom plate 262 welded to axle seat 188 and strengthening bracket 264. A wear pad 266 is mounted to chassis member 194 by bolts (not shown) or the like.

A second version 268 of the U-joint variation to the second embodiment 110 is shown in FIGS. 15 to 20 and incorporates many of the same components as shown in the embodiment 192 depicted in FIGS. 11 to 14. For example, torque arms 270, 272 are pivotally mounted at their inner ends by bushings 274, 276 from axle seat assembly 278 and compress a central elastomer spring 280 therebetween. A front hanger assembly 282 and a rear hanger assembly 284 provide the pivotal mounting point for the outer ends of torque arms 270, 272, except that U-joints 286, 288 provide the pivotal connection to hangers 282, 284 instead of the U-joints 180, 182 at the inner ends of torque arms 184, 186 of the embodiment 192 shown in FIGS. 11 to 14.

Figures 15, 16, 17, 18, 19, 20:
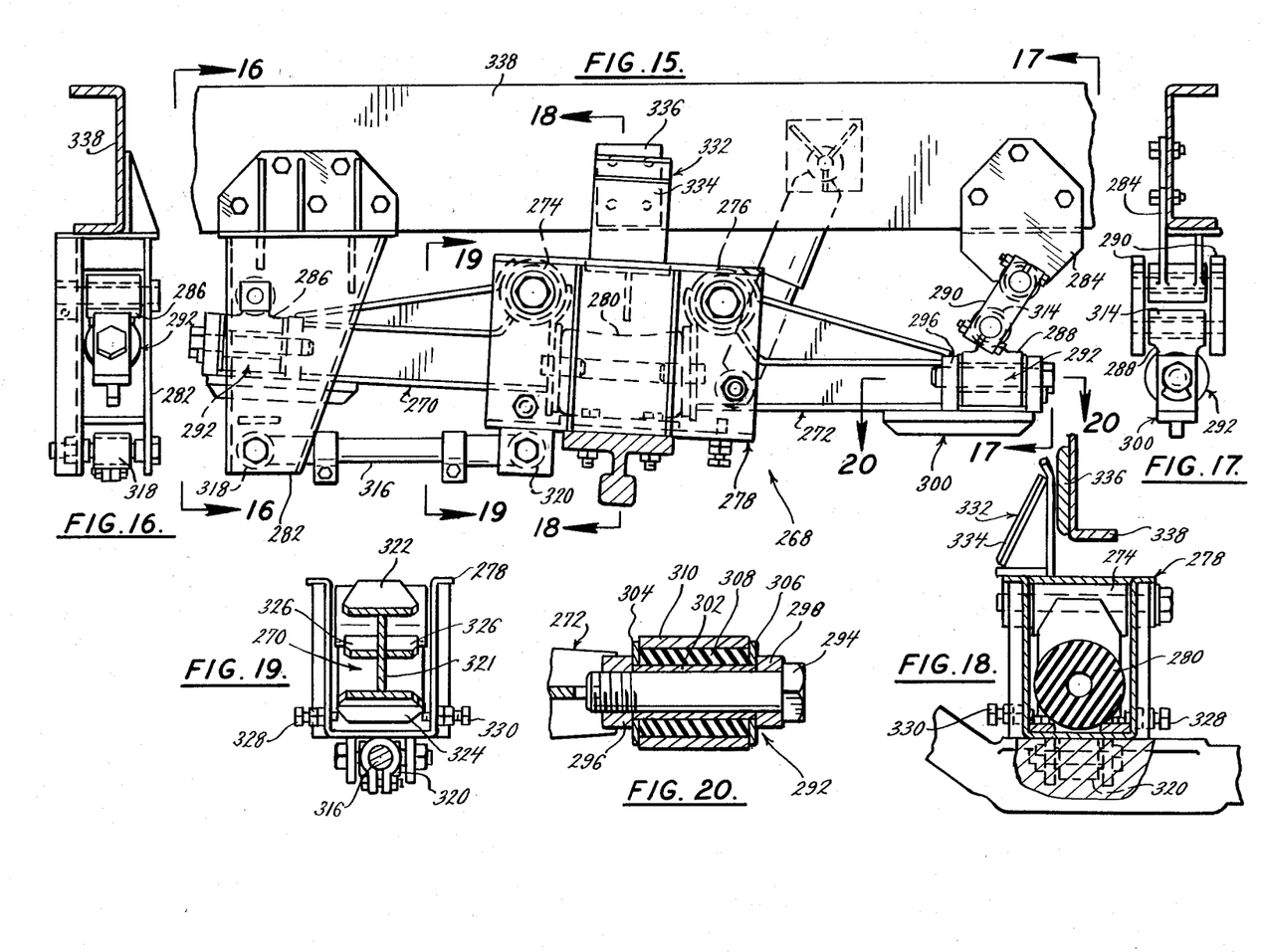
FIG. 15 is a side view of the second embodiment with the second version of the U-joint mount at the outer ends of the torque arms.
FIG. 16 is a front view of the suspension of FIG. 15 showing the front hanger assembly with the U-joint and radius rod mounted thereto.
FIG. 17 is an end view of the suspension of FIG. 15 showing the shackle assembly and coaxial bushing mounted thereto.
FIG. 18 is a cross-sectional view taken along the plane of line 18—18 in FIG. 15 detailing the beam guide and axle seat assembly.
FIG. 19 is a cross-sectional view taken along the plane of line 19—19 in FIG. 15 detailing the torque arm and radius rod.
FIG. 20 is a cross-sectional view taken along the plane of line 20—20 in FIG. 15 detailing the coaxial bushing mounting the torque arm to the shackle assembly.

As shown in FIGS. 16 and 17, the U-joints 286, 288 mount the outer ends of torque arms 270, 272 from front hanger assembly 282, and, with shackle assembly 290 forming part of U-joint 288 and inner-connecting between torque arm 272 and rear hanger assembly 284. Each U-joint 286, 288 is of substantially the same construction and includes a coaxial bushing member 292 generally aligned with the longitudinal axis of its respective torque arm 270, 272. The construction of coaxial bushing 292 is shown in greater detail in cross sectional view in FIG. 20 and includes a center bolt 294 which extends between two upstanding ear members 296, 298 which are part of bushing mounting assembly 300 shown secured to the outer end of each torque arm 270, 272 in FIG. 15. An inner sleeve 302 surrounds the shank of center bolt 204, and spacer washers 304, 306 encircle inner sleeve 302 and at opposite ends thereof. An elastomeric member 308 surrounds inner sleeve 302, and an outer bushing body 310 surrounds elastomeric member 308 and connects coaxial bushing 292 with a transversely mounted bushing 312 at the forward hanger assembly 282 and 314 at the shackle assembly 290.

An adjustable radius rod 316 is depicted in several of the views and is pivotally mounted by a forward bushing 318 to front hanger assembly 282 and by a rear bushing 320 at the axle seat assembly 278. The construction of forward torque arm 270 is shown in FIG. 19, and is typical for each of torque arms 270, 272. As shown therein, a center vertical beam 321 has an upper web 322, a lower web 324 and a pair of center webs 326 to strengthen torque arm 270. Set screws 328, 330 are mounted to axle seat assembly 278 to limit the retraction of torque arm 270 from the central elastomer spring 280.

As shown in FIG. 18, a beam guide 332 includes an upstanding bracket member 334 and a wear pad 336, wear pad 336 being secured to the frame member 338. As explained above, beam guides 332 are mounted to suspensions 268 on opposite sides of the vehicle to "capture" the chassis therebetween and limit the lateral movement of each suspension with respect to the chassis.

The shackle assembly 290 is best shown in FIG. 17 and essentially duplicates the shackle assembly 46 shown in FIG. 6 above.

OPERATION

As can be seen from both embodiments, the forward torque arm and radius rod form a parallelogram to control the axle movement and maintain its pitch as it moves up and down with respect to the chassis in response to vehicle loading, and operation over uneven surfaces. This is important in a drive axle to maintain drive line alignment during vehicle operation. Similarly, it is important in a steer axle to prevent forces generated through braking and uneven road surfaces on the steering axle from taking control of the vehicle away from the operator, especially under emergency conditions requiring maximum braking and/or turning. For example, when the brakes are applied the axle wants to turn with the wheel which, if permitted to do so, would push the drag link and turn the wheel. Parallelogram control, by maintaining the pitch of the axle constant, prevents this from happening.

The suspension resists loading through compression of the central elastomer spring. This can best be understood by referring to FIG. 1 and/or FIG. 7 and remembering that loading of the vehicle is equivalent to upward movement of the axle with respect to the chassis. As shown in FIG. 1, upper movement of the drive axle causes the front and rear torque arms to pivot about the bushings mounting same to the axle seat, thereby compressing the central elastomer spring. The shackle assembly at the rear of the second torque arm permits vertical movement of the axle as controlled by the parallelogram formed by the radius rod and first torque arm. The tension rails join the legs of the U-shaped axle seat assembly to strengthen it and prevent its deformation during vehicle operation. As can be appreciated, substantial forces are generated about the bushings mounting the torque arms to the axle seat assembly. The tension rails ensure reliable operation. When it is desired to remove the central elastomer spring, the tension rails and bolts mounting same to the axle seat assembly are removed, and the chassis elevated with respect to the axle (such as by jacking of the vehicle) which pivots the torque arms away from each other and removes the dowel pins from the cylindrical axle hole of the central spring. The central spring will then drop out and can be easily replaced by reversing the process.

The operation of applicant's second embodiment is very similar to that of the first embodiment. The forward torque arm and radius rod provide parallelogram controlled movement of the steer axle with respect to the chassis and the shackle assembly mounting the rear torque arm to the rear hanger accommodates the substantially vertical movement thereof to maintain its pitch during operation. Removal of the central spring is also accomplished in a similar manner, with the exception that set screws are removed from the bottom of the axle seat assembly and the central spring must be lifted from within the axle seat assembly after the torque arms have been pivoted away through jacking of the vehicle or the like.

In the U-joint variation of the second embodiment shown in FIGS. 11 to 20, a U-joint mounts the torque arms from either the axle seat or the chassis to permit the torque arms to rotate about their central axis and thereby eliminate any torsion in the torque arms which would otherwise be caused through unbalanced movement of the axle with respect to the chassis. Each U-joint has a transversely mounted bushing and either a coaxial bushing or a bushing aligned with the longitudinal axis of the torque arm. The transerse bushing permits arcuate movement of each torque arm through a longitudinal or vertical axis, while the coaxial or longitudinally aligned bushing of the U-joint permits pivoting of each torque arm about a lateral or transverse axis to accommodate unbalanced axle movement. In addition, either bushing of the U-joint may include an elastomeric member to permit a limited degree of oscillation between the axle and chassis to provide for further dissipation of torsional forces in the suspension.

A beam guide comprising an upstanding bracket member welded to the top of the axle seat and a wear pad bolted to the frame limits the lateral shifting of the suspensions on both sides of the vehicle by essentially capturing the longitudinal frame members between them. This provides increased lateral stability and prevents over shifting of the suspension in compensating for unbalanced axle movement. The wear pad may be easily be replaced by loosening the bolts and inserting a new wear pad. The wear pad may be constructed of a self-lubricating fiber material, as is known in the art.

There are various changes and modifications which may be made to applicant's invention or would be apparent to those skilled in the art. However, any of these changes or modifications are included in the teaching of applicant's disclosure and he intends that his invention be limited only by the scope of the claims appended hereto.

What is claimed is:

1. A vehicle suspension to support a chassis from at least one axle having an axle seat assembly for mounting the axle to the suspension, parallelogram means for pivotally connecting to and extending between a chassis member and the axle seat assembly to stabilize same, said parallelogram means including first and second load carrying torque arms for pivotally connecting to and extending between the axle seat assembly and a chassis member, a U-joint associated with each torque arm to pivotally mount an end thereof, said torque arms being mounted in opposition to each other, and a central spring means disposed between said torque arms and compressed thereby to resist axle loading.

2. The suspension of claim 1 wherein said U-joints mount one end of each of said torque arms to the axle seat assembly.

3. The suspension of claim 2 wherein said U-joint mounts each have an elastomeric member to permit limited oscillation between each of said torque arms and said axle seat.

4. The suspension of claim 1 wherein said U-joints mount one end of each of said torque arms to a chassis member.

5. The suspension of claim 4 further comprising a shackle assembly, said shackle assembly being pivotally connected to the chassis, one of said U-joints being pivotally connected to said shackle assembly.

6. The suspension of claim 5 further comprising a forward hanger assembly mounted to and depending downwardly from the chassis and wherein said torque arms are mounted along a longitudinal plane in line with the chassis, one of said U-joints mounting the forward end of the fore torque arm to said front hanger assembly the other of said U-joints mounting the rear end of the aft torque arm to the shackle assembly.

7. The suspension of claim 6 wherein each U-joint has an elastomeric member to permit limited oscillation between each of said torque arms and said axle seat.

8. A vehicle suspension to support a chassis from at least one axle having an axle seat assembly for mounting the axle to the suspension, the axle seat assembly comprising a pair of spaced bracket members mounted to the axle, parallelogram means for pivotally connecting to and extending between a chassis member and the axle seat assembly to stabilize same, said parallelogram means including first and second load carrying torque arms for pivotally connecting to and extending between the axle seat assembly and a chassis member, a U-joint associated with each torque arm to pivotally mount an end thereof, each U-joint including a first bushing pivotally mounted to and extending between said spaced bracket members, each of said torque arms being pivotally mounted to its associated first bushing, said torque arms being mounted in opposition to each other, and a central spring means disposed between said torque arms and compressed thereby to resist axle loading.

9. The suspension of claim 8 wherein each of said U-joints comprises a second bushing, each of said second bushings comprising a sleeve surrounding each of said torque arms, a collar surrounding each of said sleeves, said collar being secured to its associated first bushing and freely rotatable with respect to said sleeve, and means to retain said collar about said sleeve.

10. The suspension of claim 9 wherein each of said first bushings includes an elastomeric member to permit limited oscillation between each of said torque arms and said axle seat, and wherein each sleeve has a self lubricating fiber bearing surface for contacting its associated collar.

11. The suspension of claim 10 wherein the collar retaining means comprises a washer at each side of said collar.

* * * * *